Dec. 12, 1967     G. H. TYSON     3,357,248
TEMPERATURE INDICATING APPARATUS
Filed Oct. 23, 1964
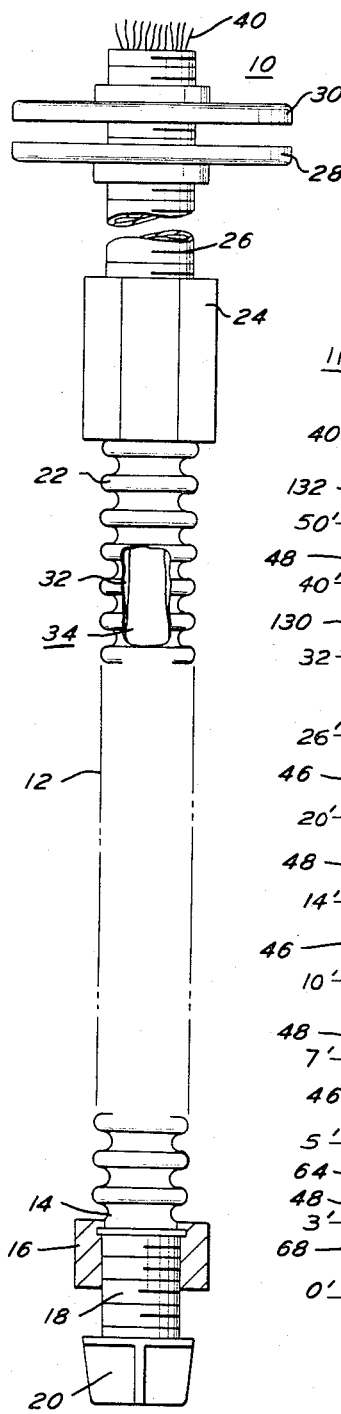
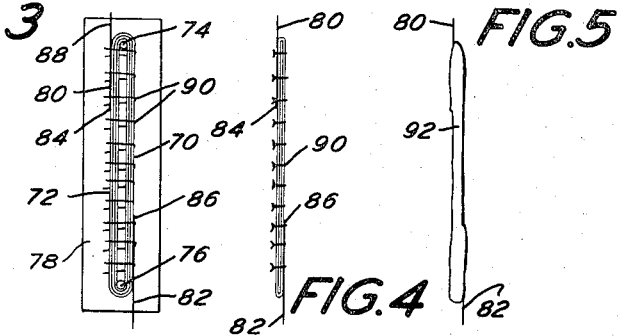
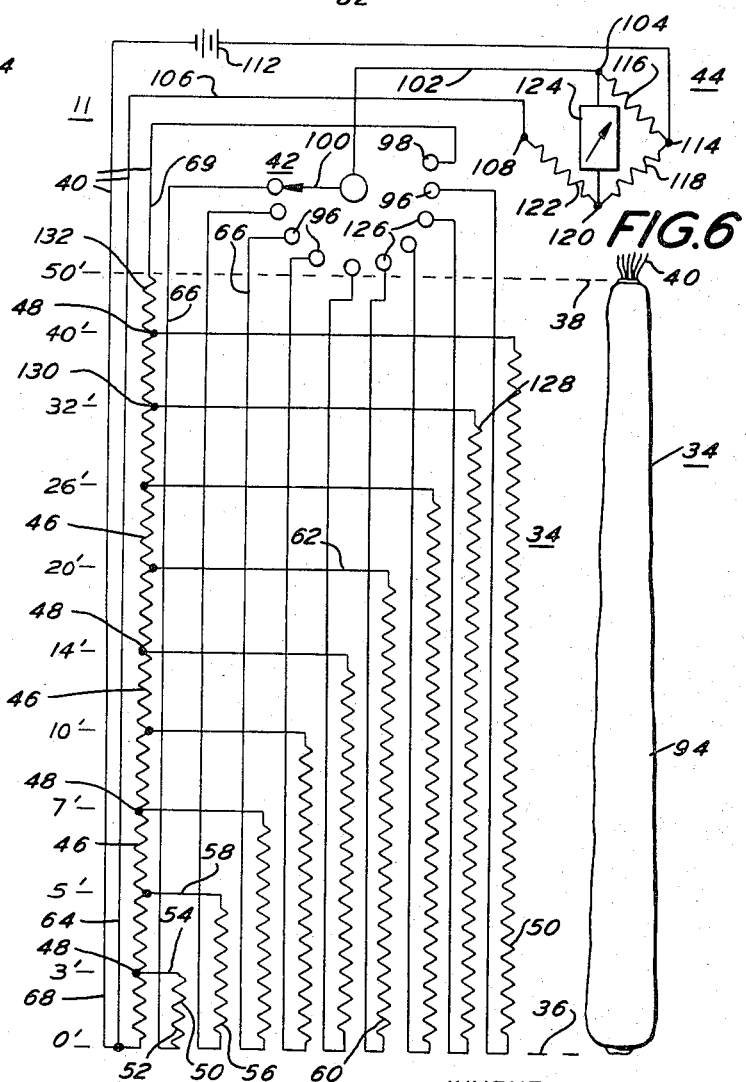
INVENTORS.
GEORGE H. TYSON
BY Jacob Trachtman
ATTORNEY

United States Patent Office 3,357,248
Patented Dec. 12, 1967

3,357,248
TEMPERATURE INDICATING APPARATUS
George H. Tyson, 301 4th Ave.,
Haddon Heights, N.J. 08035
Filed Oct. 23, 1964, Ser. No. 405,933
14 Claims. (Cl. 73—342)

The invention relates to a temperature indicating apparatus, and more particularly to a means for indicating the temperature of a liquid in a container between selected levels.

The temperature indicating apparatus provides the average temperature of a liquid in a container, which liquid may have a varying surface level. Without physical movement of the temperature sensing means, temperature is measured within the liquid and by electrically selecting portions of the means which lie within the liquid for a particular liquid level. Thus, if the temperature of the liquid is different from the surrounding atmosphere above the liquid, the measurement of the temperature within the container, including the region where the liquid is not present, would result in improper average temperature indicating for the liquid.

Although this type of temperature indicating apparatus has been heretofore provided, the present apparatus provides increased accuracy of measurement, ease in calibration for obtaining accurate readings, high durability under tensile stresses and when subject to bending stresses, as well as many other advantages.

It is a principal object of the invention to provide a new and improved temperature indicating apparatus for measuring the average temperature of a liquid in a container, which liquid may have different surface levels.

Another object of the invention is to provide a new and improved temperature indicating apparatus which is easily calibrated for providing highly accurate indications.

Another object of the invention is to provide a new and improved temperature indicating apparatus of rugged construction and adaptable for use in containers or tanks of various depths.

The above advantages, as well as many others, are achieved by providing a temperature indicating apparatus including a sensing means for indicating the average temperature of a liquid in a container between selected levels comprising a plurality of series connected temperature sensing resistance elements extending between first lower and second upper levels. The ends of the series connected elements are joined with first and second leads respectively at the first and second levels and each of the series elements is joined with next spaced series elements by respective junctions at levels spaced between the first and second levels. A plurality of temperature sensitive resistance units, each of which extends between the first level and respective junction of the said elements are each provided with a first end connected with a unit selecting line and the second end connected with its respective junction of said elements at its level.

The resistance of each element is equal to the resistance of every other element of the series of elements, while the resistance of each unit is different from the resistance of every other unit of said resistance units. The elements of each of the series elements and each unit of the resistance units are received within an electrically insulating tubular member and each of the tubular members are received within an insulating outer member extending between the first and second levels. The outer tubular member is received within a flexible liquid proof tube unit for insertion into liquid for sensing the average temperature of the liquid.

The series connected resistance elements are connected with a common lead at the first level, while each of said units are connected with a second lead at the first level, and each of said first and second leads extend to the second level. The electrical resistance between the first lead and one of the second leads is equal to the resistance between the first lead and any other of the second leads.

The temperature indicating apparatus includes means having a bridge circuit, and a switching means connecting the first lead and a selected one of said second leads with said bridge circuit for measuring the average temperature of the liquid between the first level and a corresponding selected one of said levels.

Other objects and advantages of the invention will in part be obvious and in part be described when the following specification is read in conjunction with the drawings, in which:

FIGURE 1 is a front elevational view with portions broken away of the temperature sensing means of my temperature indicating apparatus, FIGURE 2 schematically illustrates the temperature sensing means, switching means and indicating means of the temperature indicating apparatus, FIGURE 3 is a plan view showing the manner of producing the resistance elements and units of the temperature sensing means schematically illustrated in FIGURE 2, FIGURE 4 is a side elevational view of FIGURE 3, FIGURE 5 is a view similar to FIGURE 4 showing a resistance element or unit enclosed by a tubular member, and FIGURE 6 is a front elevational view of a tubular outer member of the temperature sensing means.

Like reference numerals designate like parts throughout the several views.

Referring to the figures, FIGURE 1 is a front elevational view of a temperature sensing means 10 of my temperature indicating apparatus 11 schematically illustrated in FIGURE 2.

The means 10 comprises a flexible hose member 12 which may be made of good heat conducting material such as metal and may be of the type provided with corrugations to provide flexibility. The lower end 14 of the member 12 is secured with a hexagonal nut 16 which engage a threaded tube 18 having a cap 20 threadedly engaging its end. The top 22 of the member 12 may also be provided with a hexagonal nut 24 connecting the top 22 of the member 12 with a hollow threaded pipe 26. A pair of mounting flanges 28, 30 threadedly engage the pipe 26 and are provided for being secured with the top enclosing surface of a container or a supporting bracket for positioning the temperature indicating means 10 within a container of fluid which is to have its average temperature indicated by the apparatus 11. The member 12, hexagonal nut 24 and pipe 26 provide an opening therein 32 which receives the temperature sensing circuit 34 of the indicating means 10.

The sensing circuit 34 may have various lengths depending upon the maximum depth of liquid in which the average temperature is to be measured. For the purpose of illustration, the temperature sensing circuit 34 is illustrated as being 50 ft. in length (see FIGURE 2) for extending upwardly from the zero reference level 36 to its uppermost level 38, which is 50 ft. above the reference level. The sensing circuit 34 is received within the opening or cavity 32 and has a plurality of extending leads 40 which connect with a switching means 42 and a bridge type temperature indicating circuit 44 schematically shown in FIGURE 2.

Referring to FIGURE 2, the indicating circuit 34 illustrated comprises a plurality of series connected resistance elements 46 extending from the lower reference level 36 to the upper level 38. Each of the elements 46 have various lengths and are connected with their next adjacent element 46, providing junctions 48 at 3, 5, 7, 10, 14, 20, 26, 32 and 40 foot levels intermediate the reference and upper levels 36, 38. In the present illustration, ten elements 46 are shown providing nine junctions 48 intermediate the reference and upper levels 36, 38.

A plurality of temperature sensitive resistance units 50 are provided, each extending from the reference level 36 to a respective one of the levels of the intermediate junctions 48. Thus, the particular unit 52 extends from the reference level 36 to the intermediate junction 48 which is 3 ft. above the reference level and has an end 54 connected at this junction. Similarly, the next resistance unit 56 extends from the reference level 36 to the intermediate junction 48, 5 ft. above the reference level 36, and has a lead 58 connected with the junction 48 between the resistance elements 46 at that level. The resistance unit 60 extends from the reference level 36 to an intermediate level 20 ft. above the reference level and has its upper lead 62 at this level connected with the junction 48 at the 20 ft. level between the adjacent series resistors 46. In a similar manner, a respective resistance unit 50 is provided having an upper lead connecting with the respective one of the junctions 48 of said series elements 46 at each of the intermediate levels between the reference level 36 and the upper level 38.

The series of resistor elements 46 is connected at its lower level 36 with a lead 64 which extends from the lower level 36 to the upper level 38. Each resistance unit 50 is also connected by a respective lead 66 at its reference level 36. An additional lead 68 is connected at the lower level 36 with the series of resistance elements 46 and extends upwardly to the upper level 36, while a lead 69 is connected with the series of resistance elements 46 at the upper level 38. The leads 64, 66, 68 and 69 are shown as leads 40 in FIGURES 1 and 6, extending from the temperature sensing means 10.

The temperature resistance elements and units 46, 50 are made of a temperature sensitive wire element which substantially linearly increases its resistance per unit length of the wire element with increasing temperature. Such wire material is well known in the art. The resistance elements 46 may be of equal or different lengths and equal or different resistances. In the present form, unequal lengths and equal resistances are described and shown. The resistance elements 46, as illustrated, have various lengths, being 2, 3, 4, 6, 8 or 10 feet long and they each have a resistance of 10 ohms at a predetermined temperature such as 77° Fahrenheit.

The resistance units 50 each are provided with a different length, each for extending from the reference level 36 to a respective intermediate level 48 of a junction between series resistances 46. Each resistance unit 46 is also provided with a different resistance so that the measured resistance at a predetermined temperature between the lead 64 and any one of the leads 66 has a given value of resistance, such as 100 ohms. Thus, with a resistance of 100 ohms measured between the lines 64 and any of the lines 66, the resistance of the unit 52 is 90 ohms, while the resistance of unit 56 is 80 ohms and the resistance of the unit 60 is 40 ohms to provide the required total resistance of 100 ohms. Since the resistance of the units 50 complements the measured resistance provided by included series resistors 46, the values of resistance of the units 50 depend upon the intermediate junction to which it is connected and the total resistance of the elements 46 between the intermediate junction 48 and the reference level 36.

The resistance elements 46 and units 50 are formed by providing convolutions 70 of a temperature sensitive resistance wire element 72 which may have an insulating coating, wound about spaced pins 74, 76 of a forming jig 78. The spacing between the pins 74 and 76 of the jig 78 is determined by the length of the element or unit 46, 50 which is being fabricated, while the number of convolutions 70 of the wire depends upon the resistance of the element or unit. Thus, if a unit 46 is being provided, the pins would be spaced approximately 2, 3, 4, 6, 8 or 10 feet apart and the wire element 76 would be wound about the pins until a resistance over 10 ohms is provided. At this time, the wire element is cut at a temperature of 77° Fahrenheit and its resistance is measured until a value of 10 ohms is provided. The leads 80, 82 may have their conductors soldered to respective ends 84, 86 of the wire 72 and may be provided with insulating coverings 88. Before removing the convolutions of the wire 72 from the jig 78, a plurality of spot ties 90 are secured along the length of the convolutions 70 and tied as shown in FIGURE 4 for securing the convolutions 70 of the wire 72 in close proximity to each other. This provides a compact element 46 or unit 50 upon its removal from the jig 78, providing good heat transferring conductivity between the wire elements, while allowing a degree of flexibility and allowing the support of tensile stresses exerted upon its leads 80, 82. As shown in FIGURE 5, the unit or element 46 or 50 receives over it a tubular member 92 which is made of electrical insulating material, such as Teflon or vinyl. The tubular member 92 may be originally stressed material so that it shrinks firmly about the wire 72 and leads 80, 82 when heated and allows extension therefrom in opposite directions of the leads 80, 82. The ends 80, 82 provide means by which the elements 48 and units 50 are connected to each other or to the junctions between the elements 46 and units 50 and with their leads 64, 66, 68 and 69.

In providing the units 50, the jig 78 is provided with pins 74, 76 which are appropriately spaced for the length of the particular unit 50 and the wire element 74 is provided with the required number of convolutions 70 to produce the resistance required for the particular unit 50. Of course, the size of the wire element 72 and its resistance per unit length may be appropriately chosen for the particular elements and units 46, 50 being provided. However, the temperature coefficient of resistance or the change in resistance per unit resistance with change in temperature is preferably provided equal for each of the resistance elements 72 utilized in providing the elements 46 and units 50.

The construction illustrated for the elements and units 46, 50 allows the use of copper wire elements providing high power dissipation ratings, whereby self-heating due to current flow through the elements and units is minimized by the quantity of copper material present which must be heated to raise its temperature.

With each of the elements 46 and units 50, having the construction described in connection with FIGURES 3, 4 and 5, connected together in the manner schematically illustrated in FIGURE 2 and positioned to extend respectively between the levels and intermediate levels designated therein, the combination of such connected elements and units are received within a tubular outer member 94 having an extent of approximately 60 ft. and being made of an electrical insulating material, such as Teflon or vinyl. The tubular member 94 has an opening larger than the material received therein for producing the temperature sensing circuit 34 by being originally stressed so that it shrinks when heated. When thus shrunk, the outer tubular member 94 compresses compactly within it all of the components received therein, firmly fixing their relative position and preventing their misalignment and placing each of the element units and leads in proximate relation to each other, thereby eliminating air spaces and increasing the heat conductivity and temperature responsiveness of the temperature sensing circuit 34. The above can also be accomplished by spot tying the combination of connected elements and units with spaced loops of nonconductive material, such as the ties 90 of the elements and units 46, 50.

The leads 40 of the temperature sensing circuit 34 are connected with the switching means 42 and temperature indicating circuit 44 as shown in FIGURE 2. The lines 66 are each respectively connected with a contact 96 of the switching means 42, while the line 69 is joined to the contact 98. An armature 100 of the switching means 42 may selectively electrically engage any of the contacts 96, 98 and is connected by a line 102 to the terminal 104 of the bridge indicating circuit 44.

The line 64 is joined by a line 106 with the junction 108 of the bridge indicating circuit 44, while the line 68 is connected by a line 110 through a battery 112 with a junction 114 of the bridge indicating circuit 44.

The bridge indicating circuit 44 includes a resistance element 116 connected between the junctions 104, 114, a resistance element 118 connected between the junction 114 and a junction 120, and a resistance element 122 connected to the junctions 108 and 120. An indicating unit 124, which may be a current sensing device, such as a galvanometer, is connected between the junctions 104 and 120 of the resistance indicating bridge 44 and calibrated for indicating average temperature.

In operation, the tubular member 12 of the temperature indicating means 10 is vertically positioned within a container for being received into the liquid which is to have its average temperature determined. The switching means 42 is then set in accordance with the level of the liquid within the container. Thus, if the liquid is at a 32 ft. level above a reference level coinciding with the reference level 36 of the temperature sensing means 34, the armature 100 of the switching means 42 is set to engage the contact 126. In this position, the switching means 42 connects the unit 128 of the sensing circuit 34 in series with the series elements 46, extending downwardly from the intermediate level 48 at 130. Thus, the series connected resistance unit 128 and elements 48 lie wholly within the liquid which is to have its average temperature measured and are connected by the switching means 42 and lines 106 and 102 between the terminals 104 and 108 of the bridge indicating circuit 44. If the level of the fluid is at another level, then the switching means 42 is appropriately set to the terminal 96, 98, whereby the resistance elements 46 and unit 50 provide a circuit between the terminals 104, 108 of the bridge circuit 44 which is immersed in the liquid whose temperature is to be measured. In the event that the liquid is at a level intermediate the levels provided by the resistance elements and units 46, 50, then the switching means 42 may be set to select resistance elements and units 46, 50 which are in a circuit within the liquid or which will provide the most accurate results where such resistances may only be partially out of the liquid.

The use of the combination of the resistance unit 50 with the series of resistance elements 46 within the liquid provides two paths, one of which passes current in the direction upwardly, while the other path passes current in the direction downwardly between the reference level 36 and the selected level of a junction 48 intermediate the reference and upper levels 36, 38. Such opposite currents tend to minimize magnetic effects which may otherwise be present. Construction of the elements or units 46, 50, as illustrated in connection with FIGURES 3, 4 and 5, in which close convolution construction is illustrated, also minimizes the space between convolutions. This also minimizes the magnetic field generated since current passes upwardly in one direction and downwardly in the other direction about the convolutions, and balances out the effects which might otherwise be present.

In the distribution of resistance in the temperature sensing circuit 44 by providing resistance elements 46 and units 50 in selected combinations of components passing twice through the same levels, the sensitivity of the means 36 is increased to the surrounding temperature of the liquid. Such distribution also helps to dissipate the heat generated by the current passing through the resistance elements and units 46 and 50 due to the nonlocalization of the resistance elements and units 46, 50.

It is particularly noted that the leads 66 which are of equal length and resistance, are associated respectively with each of the combinations of resistance elements 46 and units 50, and that the length of each lead 66 and its resistance does not vary with the resistance unit 50 with which it is associated. Thus, a portion of the lead 66 may be immersed in the liquid whose average temperature is being measured, while a portion thereof may extend thereabove and be out of the liquid. This will be true for all cases in which the liquid level is below the upper level 38 of the circuit 34 illustrated. The line 64 which is joined at the reference level 36 to the line 68, provides a length and resistance equal to that of the lines 66. This line extends also through the liquid to the same level to which the lines 66 extend and will be out of the liquid to the same extent as the lines 66.

Considering the circuitry of FIGURE 2, it is noted that the resistance thus provided by the line 64 will be added to the resistance of the element 122 of the bridge circuit 44, while an equal counterbalancing resistance is provided by the lines 66 to the resistance of the circuit 34 inserted between the terminals 104 and 108. Thus, irrespective of the temperature of the liquid being measured and its level with respect to the temperature indicating means 10, the leads 64, 66 provide means whereby their resistances are counterbalanced and are not effective in introducing error into the readings provided by the indicating means 44. This also allows the indicating unit 124 to be more readily and accurately calibrated for average temperature indication of the contained liquid.

The bridge circuit 44, which operates in a standard well known manner, provides a reading upon the calibrated meter 124, indicating the temperature within the liquid whose average temperature is being measured when the switching means 42 is set to an appropriate terminal 96, 98. The switch 42 when contacting the terminal 98 connects all of the series resistors 46 between the terminals 104 and 108 for indicating the average temperature in the liquid extending to the upper level 38. When thus used, the uppermost series connected resistance element 132 may be provided with a resistance of 10 ohms plus an additional resistance equivalent to the resistance of the line 66 to maintain the calibration of the bridge circuit 44.

In view of the construction illustrated above, the compactness of the elements 46 and the units 50 provides increased conductivity and temperature equalization as well as minimizing magnetic effects and self heating. This provides increased accuracy of readings of average temperature. The use of the leads 64 and 66 for counterbalancing lead resistance effects also increases the accuracy of calibration and the readings obtained by the temperature indicating means described for producing the desired average temperature indications.

While this invention has been described and illustrated with reference to a specific embodiment, it is to be understood that the invention is capable of various modifications and applications, not departing essentially from the spirit thereof, which will become apparent to those skilled in the art.

What is claimed is:

1. A temperature sensing means for indicating the average temperature of a liquid in a container between selected levels comprising a plurality of series connected temperature sensitive resistance elements having a bottom end and extending upwardly along a predetermined length and having junctures at respective predetermined locations along said length, and a plurality of temperature sensitive resistance units each having one end connected with a respective juncture of said resistance elements and providing a conductive cross section to length ratio of at least 200 circular mills per foot of length between its said first and second ends whereby erro in temperature sensing due to Joule heating of the unit is reduced.

2. A temperature sensing means for indicating the average temperature of a liquid in a container between selected levels comprising a plurality of series connected temperature sensitive resistance elements extending between first and second levels, said series elements being joined with next spaced elements by respective junctions at levels spaced between said first and second levels, and a plurality of temperature sensitive resistance units each extending between said first level and a respective junction of said elements and each having an end connected with its respective junction of said elements and another end for connecting with a unit selecting line.

3. A temperature sensing means for indicating the average temperature of a liquid in a container between selected levels comprising a plurality of series connected temperature sensitive resistance elements extending between first and second levels, the ends of said series connected elements being joined with first and second leads respectively at said first and second levels, each of said series elements being joined with next spaced series elements by respective junctions at levels spaced between said first and second levels, and a plurality of temperature sensitive resistance units each extending between said first level and a respective junction of said elements and each having a first end connected with a unit selecting line and a second end connected with its respective junction of said elements at its level.

4. The means of claim 3 in which the resistance of each element is equal to the resistance of every other element of said series elements, and the resistance of each unit is different from the resistance of every other unit of said resistance units.

5. The means of claim 4 in which each element of said series elements and each unit of said resistance units are received within an electrically insulating tubular member.

6. The means of claim 5 in which said elements and units are received within a flexible liquid proof tube unit for insertion into liquid for sensing the average temperature of the liquid.

7. In a temperature sensing means a plurality of temperature sensitive resistance units for sensing the average temperature of a liquid in a container between respective first and second levels and having first and second ends respectively at said first and second levels each comprising a temperature sensitive insulated resistance wire looped to extend between its said first and second ends with its convolutions compressed to lie proximate each other, the length of said wire being provided for giving a predetermined value of resistance for said element extending between said first and second levels at a predetermined temperature, securing loops of nonmetallic material provided along the length of said unit for securing together the convolutions of said wire, an electrically insulating tubing receiving said convolutions of wire for providing said resistance unit, and a pair of insulated leads respectively electrically connected with the ends of said wire and extending from said tubing for electrically connecting said unit, said plurality of resistance units having their leads series connected by junctions at various levels for providing average temperature sensing means between a pluality of levels in a liquid.

8. In a temperature sensing means a plurality of temperature sensitive resistance units for sensing the average temperature of a liquid in a container between respective first and second levels and having first and second ends respectively at said first and second levels each comprising a temeperature sensitive insulated resistance wire looped to extend between its said first and second ends with its convolutions compressed to lie proximate each other, the length of said wire being provided for giving a predetermined value of resistance for said element extending between said first and second levels at a predetermined temperature, securing loops of nonmetallic material provided along the length of said unit for securing together the convolutions of said wire, an electrically insulating tubing receiving said convolutions of wire for providing said resistance unit, and a pair of insulated leads respectively electrically connected with the ends of said wire and extending from said tubing for electrically connecting said unit, said plurality of resistance unit each extending between different levels from a reference level and positioned in parallel relationship to each other and connected for providing average temperature sensing means between a plurality of levels in a liquid.

9. In a temperature sensing means a plurality of temperature sensitive resistance units for sensing the average temperature of a liquid in a container between respective first and second levels and having first and second ends respectively at said first and second levels each comprising a temperature sensitive insulated resistance wire looped to extend between its said first and second ends with its convolutions compressed to lie proximate each other, the length of said wire being provided for giving a predetermined value of resistance for said element extending between said first and second levels at a predetermined temperature, securing loops of nonmetallic material provided along the length of said unit for securing together the convolutions of said wire, an electrically insulating tubing receiving said convolutions of wire for providing said resistance unit, and a pair of insulated leads respectively electrically connected with the ends of said wire and extending from said tubing for electrically connecting said unit, said plurality of resistance units providing a first plurality of resistance units having their leads series connected by junctions at various levels extending from a first reference level to a second upper level, and a second plurality of resistance units each extending from said reference level to a respective junction of said series connected units and having a first lead connected with the respective junction of the series connected units at its extending level giving a combination of resistance units extending between respective levels for providing means for sensing the temperature of said liquid between said reference level and a selected one of said plurality of levels, and a second lead for connection with a unit selecting line.

10. The means of claim 9 in which said second plurality of resistance units each has its second lead extending from said reference level to said upper level, each of said second leads being equal in length and proximate to the others of said second leads.

11. The means of claim 10 in which said first series connected resistors are connected with a common lead at the reference level, said lead being equal in length and proximate to said second leads.

12. The means of claim 11 in which the electrical resistance between said common lead and one of said second leads is equal to the resistance between said common lead and any other one of said second leads.

13. The means of claim 12 including means for indicating the average temperature of a liquid in a container between selected levels electrically connected with said common and second leads.

14. The means of claim 13 in which said indicating means comprises a bridge circuit and including switching means for connecting a selected one of said second leads with said bridge circuit for measuring the average temperature of a liquid between the reference and a corresponding selected one of said levels.

References Cited

UNITED STATES PATENTS

| | | | |
|---|---|---|---|
| 2,625,043 | 1/1953 | Tapp et al. | 73—342 |
| 2,694,930 | 11/1954 | Lamb et al. | 73—362 |
| 2,753,713 | 7/1956 | Makey | 73—342 |
| 2,800,018 | 7/1957 | Phillips et al. | 73—362 |
| 3,114,125 | 12/1963 | Werner et al. | 73—362 |

LOUIS R. PRINCE, *Primary Examiner.*

N. B. SIEGEL, D. McGIEHAN, *Assistant Examiners.*